United States Patent
Takeya et al.

(10) Patent No.: US 7,800,356 B2
(45) Date of Patent: Sep. 21, 2010

(54) POSITION DETECTION APPARATUS USING MAGNETORESISTIVE EFFECT ELEMENT

(75) Inventors: Tsutomu Takeya, Niigata-ken (JP); Takafumi Noguchi, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 12/616,382

(22) Filed: Nov. 11, 2009

(65) Prior Publication Data

US 2010/0079134 A1 Apr. 1, 2010

Related U.S. Application Data

(63) Continuation of application No. PCT/JP2008/058245, filed on Apr. 30, 2008.

(30) Foreign Application Priority Data

May 16, 2007 (JP) ............... 2007-130469

(51) Int. Cl.
*H01L 43/08* (2006.01)
*G01R 33/06* (2006.01)
*G01B 7/14* (2006.01)

(52) U.S. Cl. ............... 324/207.21; 324/207.22; 324/207.24

(58) Field of Classification Search ............ 324/207.21, 324/207.22, 207.23, 207.24, 207.25, 252; 338/32 R; 345/161; 341/32
See application file for complete search history.

(56) References Cited

U.S. PATENT DOCUMENTS

| | | | |
|---|---|---|---|
| 6,034,845 A | 3/2000 | Nagasaka et al. | |
| 6,131,457 A * | 10/2000 | Sato | 73/514.31 |
| 7,443,158 B2 * | 10/2008 | Oohashi et al. | 324/207.22 |
| 7,508,196 B2 * | 3/2009 | Oohashi et al. | 324/207.24 |
| 7,589,528 B2 * | 9/2009 | Sato et al. | 324/252 |
| 2001/0013776 A1 | 8/2001 | Coehoorn et al. | |
| 2006/0168427 A1 | 7/2006 | Alsup | |
| 2006/0256485 A1 * | 11/2006 | Seigler et al. | 360/324.12 |
| 2008/0116885 A1 * | 5/2008 | Van Zon et al. | 324/207.21 |
| 2008/0284420 A1 * | 11/2008 | Takeya et al. | 324/207.21 |

FOREIGN PATENT DOCUMENTS

| | | |
|---|---|---|
| JP | 2004-69695 A | 3/2004 |
| JP | 2005-69744 A | 3/2005 |
| JP | 2005-98942 A | 4/2005 |
| JP | 2005-291826 A | 10/2005 |
| JP | 2005-331401 A | 12/2005 |
| JP | 2006-276983 A | 10/2006 |

* cited by examiner

*Primary Examiner*—Kennth J Whittington
(74) *Attorney, Agent, or Firm*—Brinks Hofer Gilson & Lione

(57) ABSTRACT

A circular surface of a magnet is magnetized to an N-pole, and a back surface is magnetized to an S-pole. A detection unit moves in an X-Y plane at a position apart from the surface of the magnet. An X-direction detection element and a Y-direction detection element are installed in the detection unit. Both the X-direction detection element and the Y-direction detection element are magnetoresistive effect elements each having the bias magnetic field in a B-direction applied to a free magnetic layer directed perpendicular to the surface of the magnet. Each bias magnetic field is stabilized both in the X-direction detection element and the Y-direction detection element such that the detection unit accurately provides position detection output values in the X- and Y-directions.

4 Claims, 10 Drawing Sheets

POSITION DETECTION APPARATUS USING MAGNETORESISTIVE EFFECT ELEMENT

CLAIM OF PRIORITY

This application claims benefit of the Japanese Patent Application No. 2007-130469 filed on May 16, 2007, which is hereby incorporated by reference. Background

BACKGROUND OF THE INVENTION

1. Field of the Invention

The present invention relates to a position detection apparatus for detecting a position of a movable portion in a plane using a magnetoresistive effect element and a magnet.

2. Description of the Related Art

Japanese Unexamined Patent Application Publication Nos. 2005-331401, 2005-69744 and 2004-69695 as below disclose the position detector which employs the magnet and the detection unit for detecting the magnetic field generated by the magnet.

Each of the position detector disclosed in the aforementioned documents has the detection unit provided with the element capable of detecting intensity of the magnetic field such as a hall element. The intensity of the magnetic field generated from the surface of the magnet, which is directed orthogonally to the surface is detected by the detection unit to locate an opposed position between the magnet and the detection unit.

The detection unit as disclosed in the aforementioned documents serves to detect only the magnetic field intensity perpendicular to the magnet surface such as the hall element, thus restricting the region which allows the detection unit to identify the position. When the magnet has the upper surface magnetized to N-pole and the back surface magnetized to S-pole, and the detection unit is oppositely positioned to the upper surface, the change in the intensity of the magnetic field perpendicular to the upper surface upon movement of the detection unit away from the center of the magnet surface to one side is the same as the change upon movement of the detection unit away from the center to the other side. The magnetic field intensity may be detected by the detection unit which moves while passing the center. However, the position cannot be identified as to which side the position is located with respect to the center.

As a result, the region which allows the detection unit to detect the position becomes considerably narrow, and the magnet has to be made large for the purpose of accurately detecting the position of the detection unit on the X-Y coordinate in the wider region. The use of the hall element for the detection unit may complicate the circuit for forming the detection unit.

Japanese Unexamined Patent Application Publication No. 2006-276983 discloses the magnetic sensor for detecting the magnetic field generated by the circular magnet when it moves. The magnetic sensor is provided with four huge magnetoresistive effect elements, two of which detect X-direction component of the magnetic flux from the magnet, and the other two of which detect Y-direction component of the magnetic flux from the magnet. The difference of the change in the resistance values between the two huge magnetoresistive effect elements for detecting the X-direction component of the magnetic flux, and the difference of the change in the resistance values between the other two huge magnetoresistive effect elements for detecting the Y-direction component of the magnetic flux are obtained, respectively to locate the position of the magnet.

Each of the huge magnetoresistive effect elements is incapable of distinguishing between the oppositely directed magnetic fluxes, that is, the positive and the negative directions. It is therefore difficult to accurately identify the movement position of the magnet.

In the case where the two huge magnetoresistive effect elements for detecting the X-direction component of the magnetic flux move away from the center toward the Y-direction, not only the X-direction component of the magnetic field but also the Y-direction component of the magnetic field are applied to the free magnetic layer of the huge magnetoresistive effect element. Accordingly, magnetization of the free magnetic layer becomes unstable, which prevents the accurate detection of the resistance change corresponding to the movement position of the magnet toward the X-direction.

SUMMARY OF THE INVENTION

The present invention provides a position detection apparatus which employs a magnetoresistive effect element capable of identifying the position in a wide region including the center of the magnet surface by means of a relatively small magnet and the detection unit.

The present invention provides a position detection apparatus which includes a fixed portion and a movable portion which moves along a plane opposite the fixed portion. A magnet is provided for one of the fixed portion and the movable portion, and a detection unit for detecting a magnetic field generated from the magnet is provided for the other of the fixed portion and the movable portion. The magnet has a surface to which the detection unit is oppositely disposed, and the surface and a back side portion are magnetized to opposite magnetic poles. The detection unit includes a magnetoresistive effect element which is provided with a fixed magnetic layer having a magnetizing direction fixed, and a free magnetic layer magnetized by the magnetic field applied from the magnet, and has an electric resistance value changed in accordance with a relative angle defined by a fixing magnetizing direction of the fixed magnetic layer and a magnetizing direction of the free magnetic layer so that the fixing magnetizing direction of the fixed magnetic layer is directed along the plane, and a bias magnetic field orthogonal to the plane is applied to the free magnetic layer. A change in a resistance of the magnetoresistive effect element allows detection of a position of the movable portion in the plane.

The position detection apparatus according to the present invention has the bias magnetic field of the free magnetic layer of the magnetoresistive effect element installed in the detection unit orthogonally directed to the moving plane of the movable portion. This makes it possible to suppress the influence of the magnetic field from the magnet to the bias magnetic field when the magnetoresistive effect element is located opposite the position apart from the center of the magnet. Accordingly, the position detection may be conducted with high accuracy while keeping the bias magnetic field in the stable state.

The present invention allows detection of each displacement of the detection unit toward one side and the other side with respect to a center of the magnet at which a magnetic field component in a direction of the plane becomes theoretically zero.

The detection unit includes two units of the magnetoresistive effect elements, which have fixing magnetizing directions of the fixed magnetic layers orthogonal with each other, and directions of the bias magnetic fields perpendicular to the plane. This makes it possible to two-dimensionally detect the moving direction of the movable portion with respect to the fixed portion.

Basically, the surface of the magnet is flat. However, the surface may have a convex shape with the raised center, or may have a regular concavo-convex shape.

Preferably, the surface of the magnet has a circular shape. In the case where the surface has a circular shape, the intensity change of the magnetic field in parallel with the moving plane which changes as it moves away from the center becomes uniform in the radially extending direction from the center. This allows the detection unit to detect the position opposite the magnet surface accurately. The surface of the magnet may have the arbitrary shape such as the oval and the quadrangle with rounded corners.

ADVANTAGE OF THE INVENTION

The present invention allows the detection unit to detect its position opposite the magnet in a relatively wider region when the magnet and the detection unit relatively move along the moving plane. The compact precision equipment is allowed to realize the high precision position detection. When the detection unit is at the position apart from the magnet center, the bias magnetic field applied to the free magnetic layer of the magnetoresistive effect element is insusceptible to the intensity of the magnetic field generated from the magnet, resulting in high precision detection of the movement position of the movable portion in the wider range.

BRIEF DESCRIPTION OF THE DRAWINGS

FIG. 8 shows a relationship between the X-direction detection element according to the example of the present invention and the magnet, wherein

DESCRIPTION OF THE PREFERRED EMBODIMENTS

Figure 1:
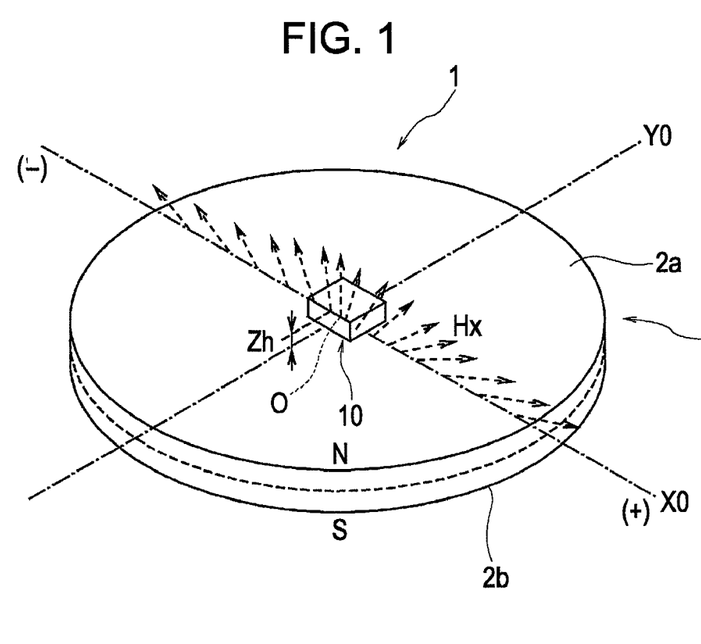
FIG. 1 is a perspective view showing a position detection apparatus according to an example of the present invention.

FIG. 1 is a perspective view showing a position detection apparatus 1 according to an example of the present invention.

Figure 3:
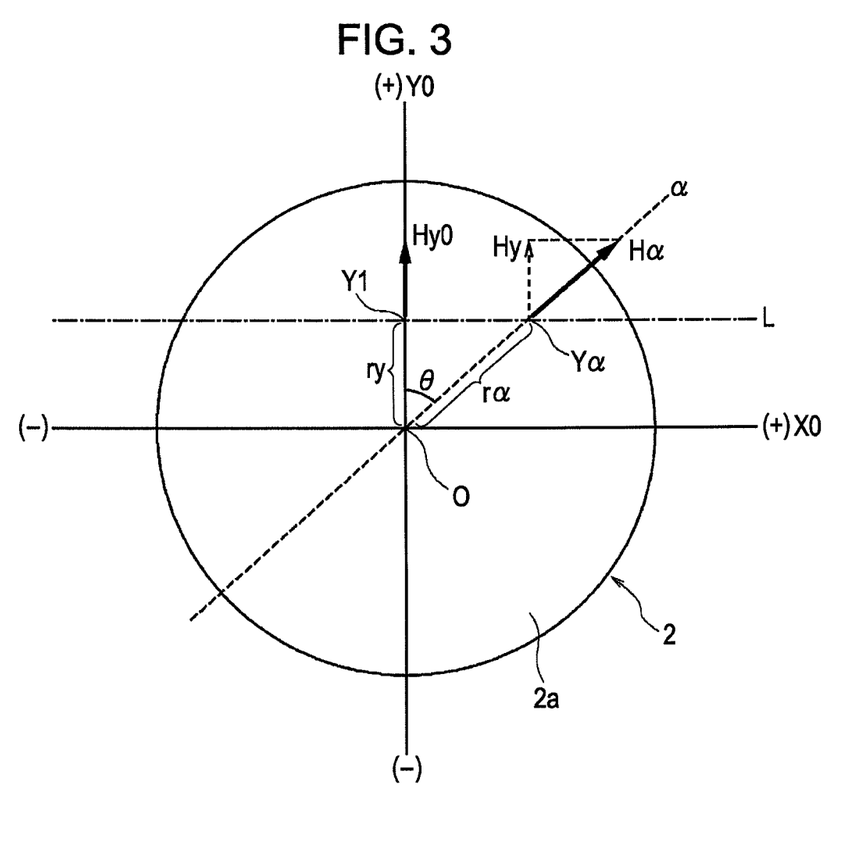
FIG. 3 is a plan view of the magnet.

The position detection apparatus 1 includes a magnet 2 and a detection unit 10 opposite the magnet 2. The magnet 2 is formed to have a uniform thickness such that a surface 2a is in parallel with a back surface 2b at a backside. Referring to FIGS. 1 and 3, each of X0-axis and Y0-axis represents an orthogonal coordinate. The plane in parallel with the one including the X0-axis and the Y0-axis refers to a moving plane which is in parallel with the surface 2a of the magnet 2. The detection unit 10 is fixed, and the magnet 2 is moved to an arbitrary position on the X-Y coordinate in the moving plane. Alternatively, the magnet 2 is fixed, and the detection unit 10 is moved to the arbitrary position on the X-Y coordinate in the moving plane.

For example, the position detection apparatus 1 is mounted inside the compact precision equipment which is provided with a fixed portion and a movable portion. The movable portion is moved in the X-Y coordinate by a magnetically driven actuator for applying driving force toward X-direction, and a magnetically driven actuator for applying the driving force toward Y-direction. One of the fixed portion and the movable portion is provided with the magnet 2, and the other is provided with the detection unit 10. The position of the movable portion moved by the respective magnetically driven actuators is detected by the position detection apparatus 1. The control unit monitors the position detection output from the position detection apparatus 1 to allow the driving operation while identifying the movement position of the movable portion with high precision.

It is assumed that the magnet 2 is provided for the fixed portion, and the detection unit 10 is installed in the movable portion in the example. The magnet 2 may be installed in the movable portion, and the detection unit 10 may be provided for the fixed portion.

Both the surface 2a and the back surface 2b of the magnet 2 have circular shapes, and the center of the circle, that is, the center of the magnet 2 is represented by "O" as shown in the perspective view of FIG. 1 and the plan view of FIG. 3. An intersection of the X0-axis and the Y0-axis of the orthogonal coordinate is at the same position as the center O of the magnet on the plane. Referring to FIG. 1, the magnet 2 has the surface 2a magnetized to the N-pole, and the back surface 2b magnetized to the S-pole, and the magnetic field line extends from the entire region of the surface 2a toward the entire region of the back surface 2b. The detection unit 10 moves in the moving plane in parallel with the plane which includes the X0-axis and the Y0-axis at the position apart from the surface 2a by a predetermined height of Zh. The detection unit 10 may be directed opposite the back surface 2b magnetized to the S-pole and moved at the position apart from the back surface 2b.

Figure 2:
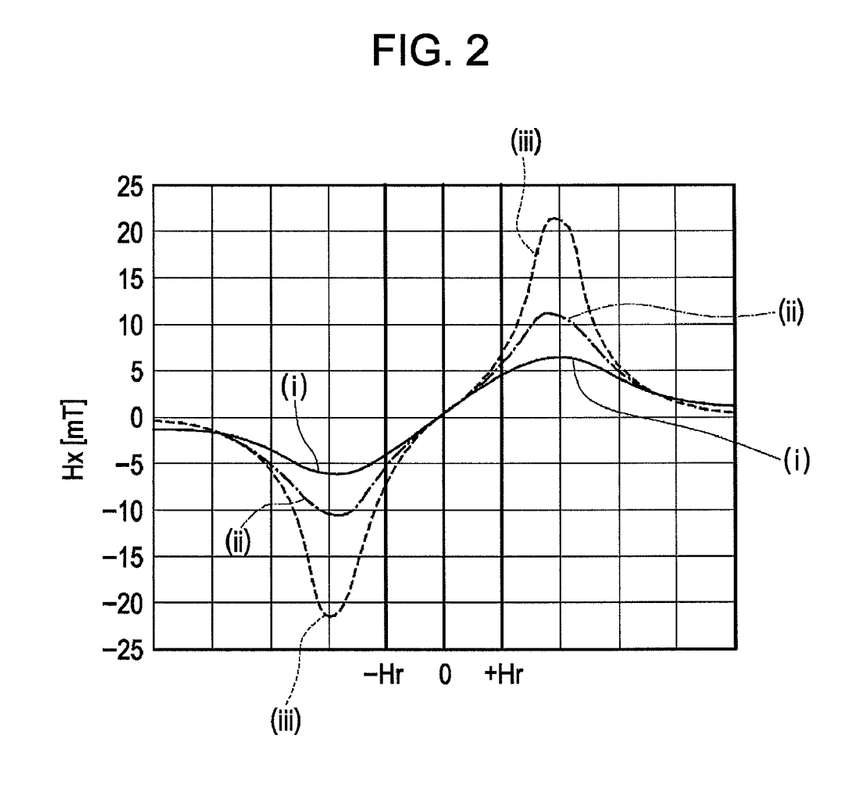
FIG. 2 is a graph showing a change in a magnetic field intensity Hx on the X0-axis extending in parallel with the magnet surface.

Among the magnetic field lines directed to the S-pole of the back surface 2b from the N-pole of the upper surface 2a of the magnet 2, only the one positioned on the X0-axis is shown by a dashed line in FIG. 1. Referring to FIG. 2, the X-axis represents the distance from the center O of the magnet 2 on the X0-axis, and Y-axis represents intensity Hx of X-direction component of the magnetic field at each position on the X0-axis. Theoretically, the direction of the magnetic field line is perpendicular to the X-Y plane, and intensity of the component of the magnetic field directed to the X-Y plane is zero. As the distance from the center O of the magnet 2 increases in the radial direction in the plane, the gradient of the magnetic field line with respect to the perpendicular of the X-Y plane gradually increases. The intensity Hx of the X-direction component of the magnetic field from the surface 2a of the magnet 2 increases as the distance from the center O increases.

In the example, the surface 2a of the magnet 2 has a circular plane with diameter of 6 mm. The thickness of the magnet 2 is 1 mm. FIG. 2 shows each intensity Hx of the X-direction component of the magnetic field obtained in the cases where the height Zh from the surface 2a of the magnet 2 is set to 1.5 mm, 1.0 mm and 0.5 mm, respectively. A curve (i) represents the change in the intensity Hx of the X-direction component of the magnetic field in case of Zh=1.5 mm. A curve (ii) represents the change in the intensity Hx of the X-direction component of the magnetic field in case of Zh=1.0 mm. A curve (iii) represents the change in the intensity Hx of the X-direction component of the magnetic field in case of Zh=0.5 mm. Referring to FIG. 2, the intensity Hx of the X(+)-direction component of the magnetic field is expressed as a positive value, and the intensity Hx of the X(−)-direction component of the magnetic field is expressed as a negative value.

The intensity Hx of the magnetic field to the X-direction changes substantially direct functionally in the range from +Hr and −Hr with respect to the center O of the surface 2a of the magnet 2 in the X-direction. The range from +Hr to −Hr differs depending on the diameter of the magnet and the intensity of the magnetic field. In the case where the diameter is equal to or larger than 5 mm or 6 mm, the intensity of the magnetic field changes substantially direct functionally so long as the +Hr is set to +2 mm and −Hr is set to −2 mm. This applies to the change in the intensity Hy of the Y-direction component of the magnetic field on the Y0-axis.

FIG. 3 shows a radiation axis □ which is an arbitrary axis other than the X0-axis and the Y0-axis while passing the center O of the magnet 2. In the magnetic field from the surface 2a of the magnet 2 on the radiation axis □, the change in the intensity H□ of the component toward the □ direction changes substantially direct functionally at the same ratio as in the cases of the change in the intensity Hx of the X-direction component of the magnetic field on the X0-axis, and the change in the intensity Hy of the Y-direction component of the magnetic field on the Y0-axis, respectively.

FIG. 3 shows a line L which is in parallel with the X0-axis and passes a position Y1 on the Y0-axis on the surface 2a of the magnet 2. The distance between the center O and the position Y1 on the Y0-axis corresponds to a radius ry. Assuming that the intersection of the radiation axis □ and the line L is defined as Y□, the distance between the center O and the intersection Y□ becomes the radius r□.

It is assumed that the intensity of the Y-direction component of the magnetic field at the position Y1 is set to Hy0, and the intensity of the □-direction component of the magnetic field at the intersection Y□ is set to H□. If the radius from the center O is in the range from −Hr to +Hr as shown in FIG. 2, the intensity Hy0 is substantially proportional to the radius ry, and the intensity H□ is substantially proportional to the radius r□ as well. A proportional constant of the intensity Hy0 obtained when the position changes on the Y0-axis is the same as that of the intensity H□ obtained when the position changes on the radiation axis □. The proportional constant is the direct function. Assuming that the proportional constant of the direct function is set to □, each intensity may be expressed by the equation of Hy0=a·ry or H□=a·r□.

Assuming that the angle defined by the Y0-axis and the radiation axis □ is set to □, the intensity Hy of the Y-direction component of the magnetic field at the intersection Y□ is expressed by the equation of Hy=H□·cos □=a·r□·cos □. As the equation of r□·cos □=ry is established, the intensity may be expressed by the equation of Hy=a·ry=Hy0.

If the radius from the center O is in the range from −Hr to +Hr as shown in FIG. 2, the intensity Hy of the Y-direction component of the magnetic field is kept the same at any position on the line in parallel with the X0-axis, and the intensity Hx of the X-direction component of the magnetic field is kept the same at any position on the line in parallel with the Y0-axis.

Figure 4:
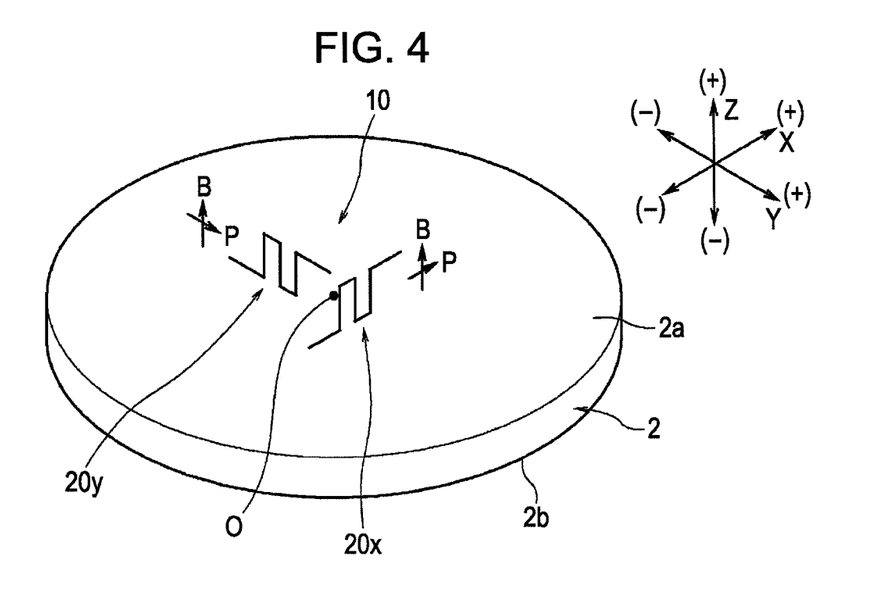
FIG. 4 is a perspective view showing a positional relationship among an X-direction detection element and a Y-direction detection element installed in a detection unit according to the example of the present invention, and the magnet.

An X-direction detection element 20x and a Y-direction detection element 20y shown in FIG. 4 are installed in the detection unit 10. Both the X-direction detection element 20x and the Y-direction detection element 20y are magnetoresistive effect elements, each dimension of which is sufficiently smaller than the one shown in FIG. 4. The distance between the X-direction detection element 20x and the Y-direction detection element 20y is very small. In the case where the detection unit 10 provided with the X-direction detection element 20x and the Y-direction detection element 20y is moved in the X-Y plane in parallel with the surface 2a of the magnet 2, the coordinate position of the X-direction detection element 20x on the X-Y coordinate may be recognized as being at the same position as the coordinate position of the Y-direction detection element 20y.

The detection unit 10 is moved in the plane in parallel with the surface 2a of the magnet 2. The intensity Hdx of the X-direction component of the magnetic field is detected by the X-direction detection element 20x, and the intensity Hdy of the Y-direction component of the magnetic field is detected by the Y-direction detection element 20y so as to provide an opposed position between the detection unit 10 and the magnet 2 on the X-Y coordinate.

The X-direction detection element 20x is capable of determining the positive/negative direction of the X-direction component of the magnetic field. The Y-direction detection element 20y is capable of determining the positive/negative direction of the Y-direction component of the magnetic field. This makes it possible to determine whether the position at which the detection unit 10 is positioned opposite the surface 2a of the magnet 2 is at the (+)X side or (−)X side with respect to the center O of the magnet 2. This also makes it possible to determine whether the opposite position is located at the (+)Y side or (−)Y side with respect to the center O.

Figure 5A:
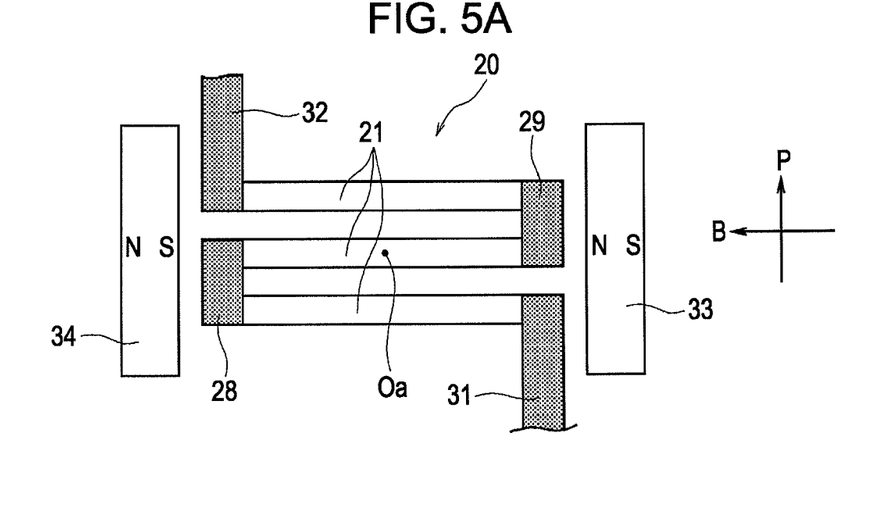
FIG. 5A is a plan view showing a structure of a magnetoresistive effect element.

FIG. 5A illustrates a magnetoresistive effect element 20 serving as the X-direction detection element 20x and the Y-direction detection element 20y.

The magnetoresistive effect element 20 has plural element portions 21 arranged in parallel with one another, and two adjacent front ends and two adjacent rear ends of the element portions 21 are respectively connected with connection electrodes 28 and 29. Uppermost and rearmost element portions 21 are connected to lead-out electrodes 31 and 32, respectively. The respective element portions 21 are connected in series to form a meandered pattern. FIG. 5A shows a geometric center Oa of the element portions 21.

Figure 6:
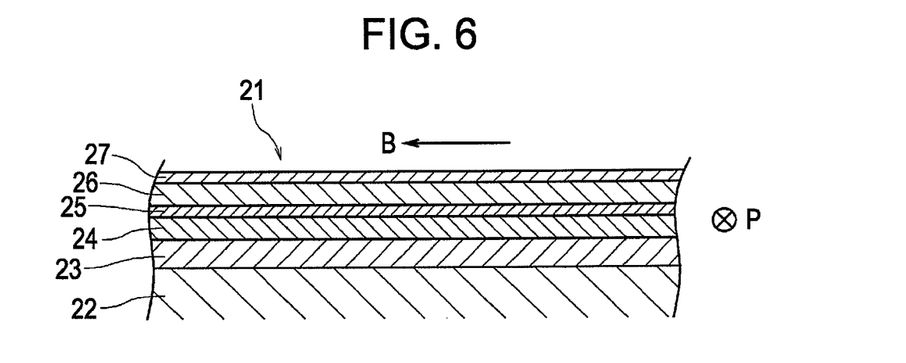
FIG. 6 is a sectional view of an element portion of the magnetoresistive effect element.

Referring to a sectional view of FIG. 6, each of the element portions 21 is formed by laminating an antiferromagnetic layer 23, a fixed magnetic layer 24, a non-magnetic conducting layer 25, and a free magnetic layer 26 on a substrate 22, having the surface of the free magnetic layer 26 covered with a protection layer 27.

The antiferromagnetic layer 23 is formed of an anti-ferromagnetic material such as Ir—Mn alloy (iridium-manganese alloy). The fixed magnetic layer 24 is formed of a soft magnetic material such as Co—Fe alloy (cobalt-iron alloy). The non-magnetic conducting layer 25 is formed of Cu (copper) and the like. The free magnetic layer 26 is formed of a soft magnetic material such as Ni—Fe alloy (nickel-iron alloy). The protection layer 27 is formed of a Ta (tantalum) layer.

Figure 5B:
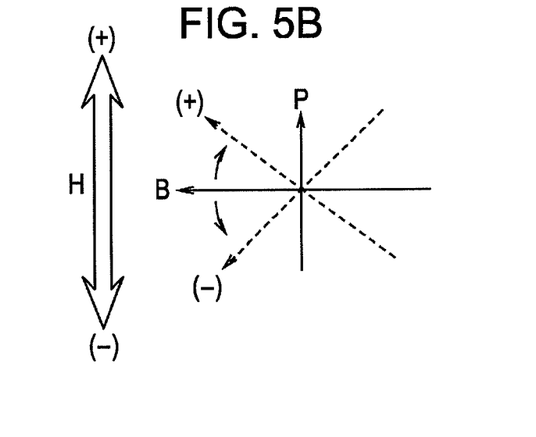
FIG. 5B is an explanatory view representing a magnetizing direction of a fixed magnetic layer of the magnetoresistive effective element and a direction of the bias magnetic field.

In the element portion 21, antiferromagnetic bonding between the antiferromagnetic layer 23 and the fixed magnetic layer 24 fixes the magnetizing direction of the fixed magnetic layer 24. Referring to FIG. 5B, each of the element portions 21 has the fixing magnetizing direction (P-direction) of the fixed magnetic layer 24 orthogonal to the longitudinal direction of the element portion 21.

Referring to FIG. 5A, the magnetoresistive effect element 20 is provided with a magnet 33 at the right side, and a magnet 34 at the left side for applying the bias magnetic field to the respective element portions 21 in the direction in parallel with the longitudinal direction. The bias magnetic field directs magnetization of the free magnetic layer 26 to the B-direction for short magnetic domain. As the solid line of FIG. 5B shows, when the intensity H of the external magnetic field applied in the direction in parallel with the fixing magnetizing direction (P-direction) of the fixed magnetic layer 24 is zero, the magnetizing direction in the free magnetic layer 26 is directed to the B-direction to which the bias magnetic field is applied. That is, the magnetizing direction of the free magnetic layer 26 is orthogonal to the fixing magnetizing direction (P-direction) of the fixed magnetic layer 24.

The magnetoresistive effect element 20 has the electric resistance changed in accordance with the relationship between the fixing magnetizing direction (P-direction) of the fixed magnetic layer 24, and the magnetizing direction of the free magnetic layer 26. When the external magnetic field (+H) is applied to the element portion 21 of the magnetoresistive effect element 20 upward ((+) direction in parallel with the fixing P-direction) as shown in FIG. 5B, the magnetizing direction in the free magnetic layer 26 to which the bias magnetic field is applied is inclined to the (+) direction. As the relative angle defined by the magnetizing direction in the free magnetic layer 26 and the fixing magnetizing direction (P-direction) of the fixed magnetic layer 24 is made small, the electric resistance is decreased. Meanwhile, when the external magnetic field (−)H is applied to the lower side ((−) direction in parallel with the fixing P-direction) of FIG. 5B, the magnetizing direction of the free magnetic layer 26 to which the bias magnetic field is applied is inclined to the (−) direction. As the gradient becomes large, the relative angle defined by the magnetizing direction in the free magnetic layer 26 and the fixing magnetizing direction (P-direction) of the fixed magnetic layer 24 is made large to increase the electric resistance.

As FIG. 4 shows, the X-direction detection element 20x installed in the detection unit 10 has the same structure as that of the magnetoresistive effect element 20, to which the geometric center Oa shown in FIG. 5A is oppositely located at the height Zh from the surface 2a of the magnet 2 in the range from 0.5 to 1.5 mm. The Y-direction detection element 20y has the same structure as that of the magnetoresistive effect element 20 as well, to which the geometric center Oa is oppositely located at the height Zh from the surface 2a of the magnet 2 in the range from 0.5 to 1.5 mm.

Referring to FIG. 4, the X-direction detection element 20x has the fixing magnetizing direction (P-direction) of the fixed magnetic layer 24 of the element portion 21 directed to the (+)X direction, and the bias direction (B-direction) directed to the (+)Z-direction, that is, perpendicular to the X-Y plane upward. The Y-direction detection element 20y has the fixing magnetizing direction (P-direction) of the fixed magnetic layer 24 of the element portion 21 directed to the (+)Y-direction, and the bias direction (B-direction) directed to the (+)Z-direction, that is, perpendicular to the X-Y plane upward. Accordingly, both the X-direction detection element 20x and the Y-direction detection element 20y have fixing magnetizing directions (P-direction) of the fixed magnetic layers 24 intersecting in the X-Y plane.

Figure 7:
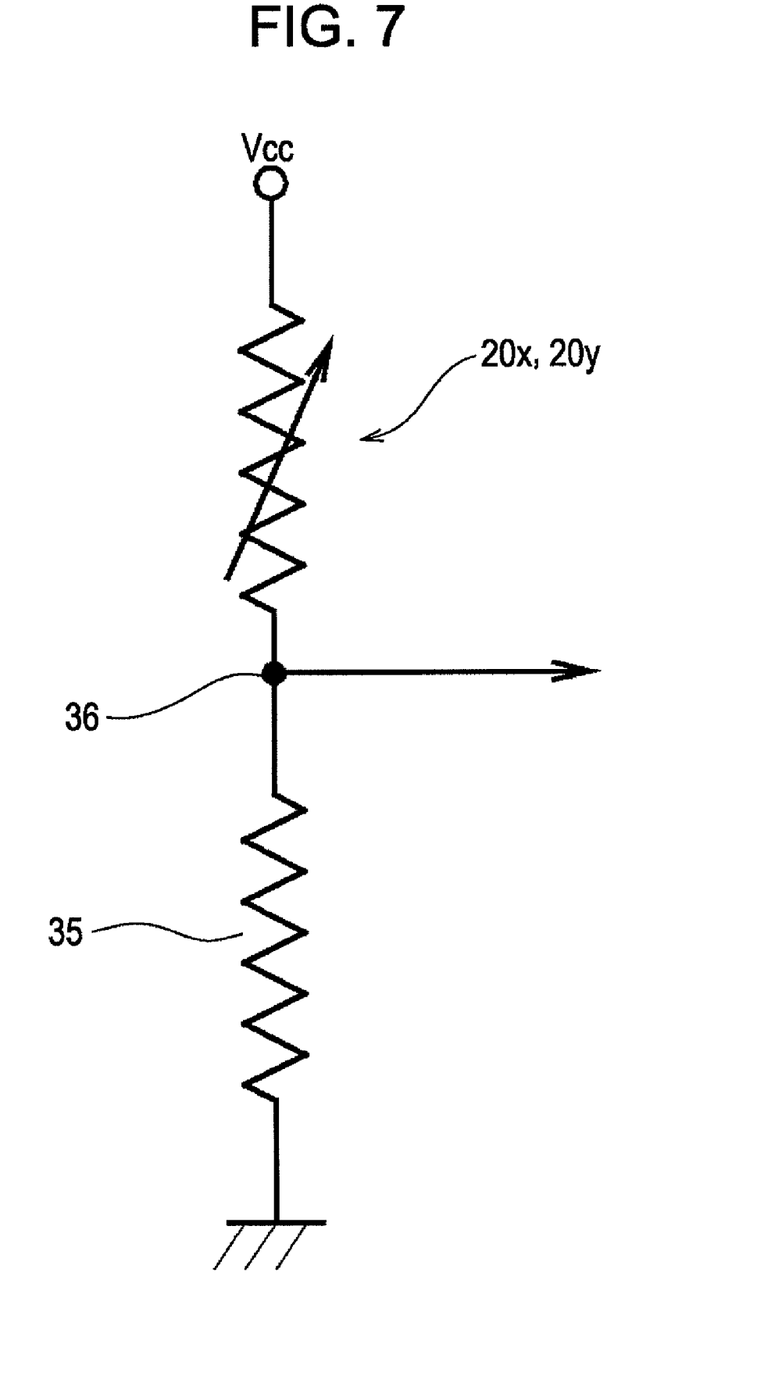
FIG. 7 is a circuit diagram showing an example of a structure of a circuit for forming the detection unit.

FIG. 7 represents an example of the detection circuit for detecting the resistance change of the X-direction detection element 20x in the detection unit 10. In the detection circuit, the X-direction detection element 20x is connected to the fixed resistance element 35 in series, to which power-supply voltage Vcc as the direct current at the constant voltage is applied. An intermediate point 36 between the X-direction detection element 20x and the fixed resistance element 35 serves as an output portion of the detection output based on the change in the resistance value of the X-direction detection element 20x. The electric resistance value of the X-direction detection element 20x is the same as that of the fixed resistance element 35 when the external magnetic field is not applied.

When the detection unit 10 moves toward the (+)X side from the center O of the magnet 2, the magnetizing direction of the free magnetic layer 26 inclines toward the (+)X-direction in the X-direction detection element 20x, and accordingly, the electric resistance of the X-direction detection element 20x gradually decreases. A potential at the intermediate point 36 shown in FIG. 7 becomes higher than the Vcc/2. Conversely, when the detection unit 10 moves toward the (−)X-direction from the center O of the magnet 2, the magnetizing direction of the free magnetic layer 26 in the X-direction detection element 20x inclines to the (−)X-direction, and accordingly, the electric resistance of the X-direction detection element 20x becomes large. The potential at the intermediate point 36 shown in FIG. 7 becomes lower than the Vcc/2. In this way, detection of the potential at the intermediate point 36 allows the detection with respect to displacement of the detection unit 10 to the (+)X or (−) side from the center O of the magnet 2.

The detection unit 10 has the Y-direction detection element 20y connected to the fixed resistance element 35 in series likewise the one shown in FIG. 7. The potential at the intermediate point 36 is set to the Vcc/2 when the external magnetic field is not applied. As the detection unit 10 moves toward the (+)Y-direction while passing the center O of the magnet 2, the potential at the intermediate point 36 becomes higher than the Vcc/2. As the detection unit 10 moves toward the (−)Y-direction while passing the center O of the magnet 2, the potential at the intermediate point 36 becomes lower than the Vcc/2. Detection of the potential at the intermediate point 36 between the Y-direction detection element 20y and the fixed resistance element 35 allows detection with respect to displacement of the detection unit 10 to the (+)Y side or the (−)Y side from the center O of the magnet 2.

Figure 8A:
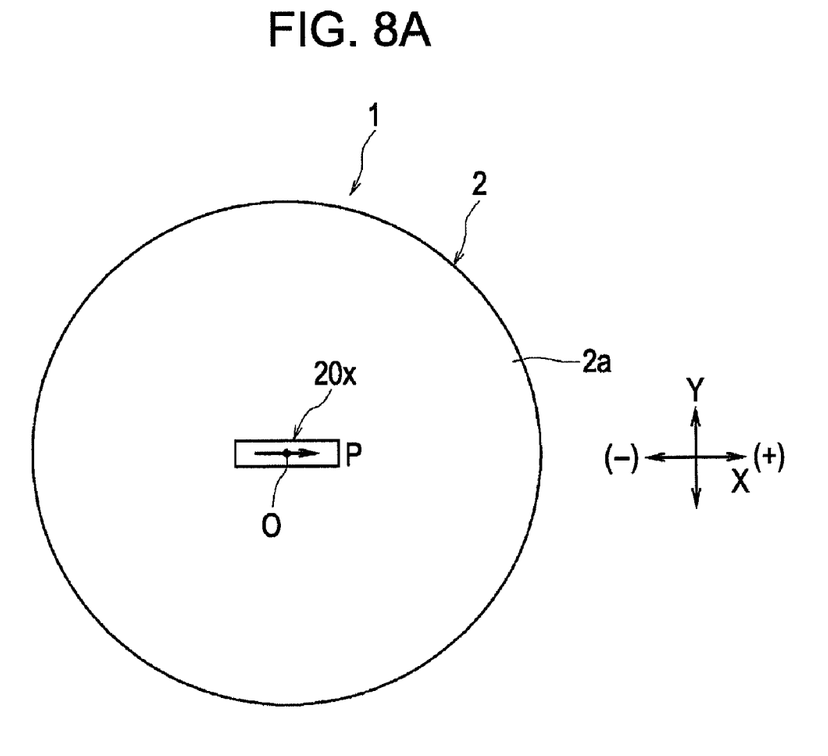
FIG. 8A is a plan view.
Figure 8B:
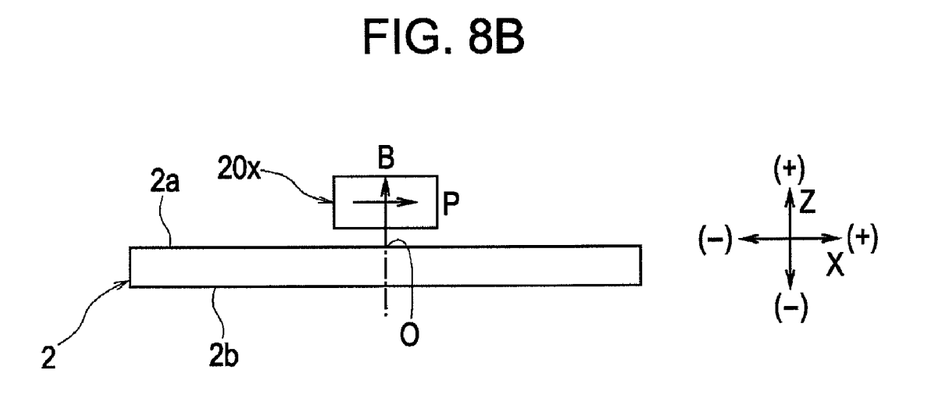
FIG. 8B is a side view.
Figure 9:
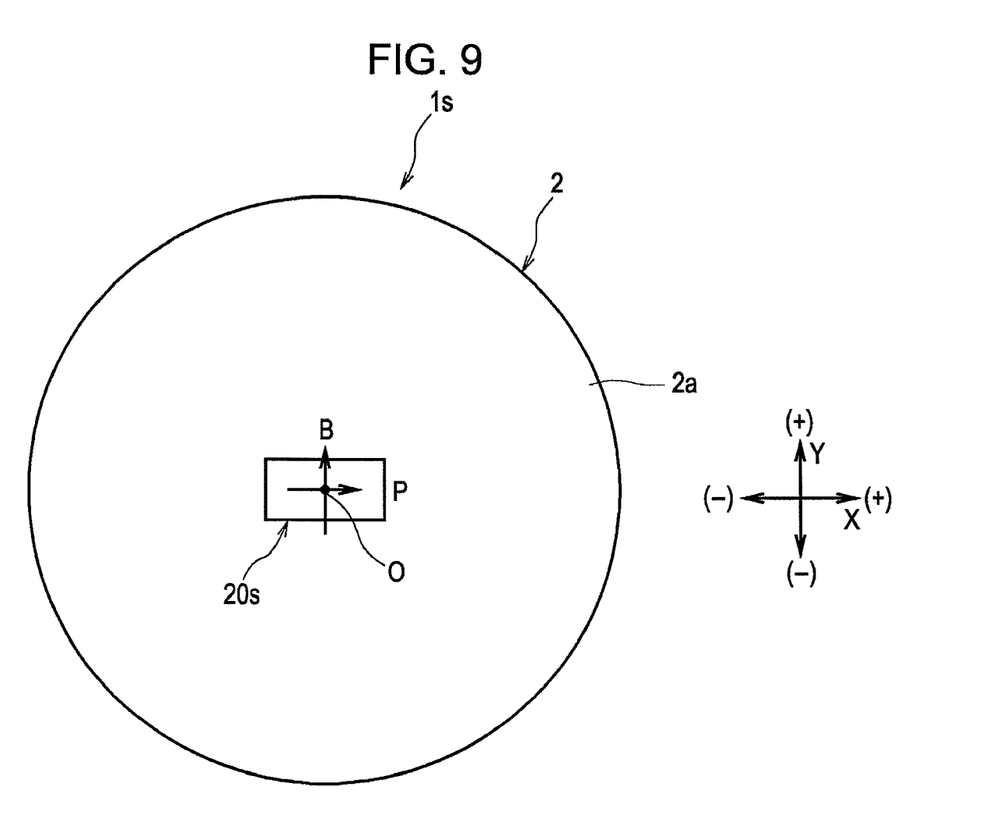
FIG. 9 is a plan view showing a relationship between an X-direction detection element of a comparative example and the magnet.
Figure 10:
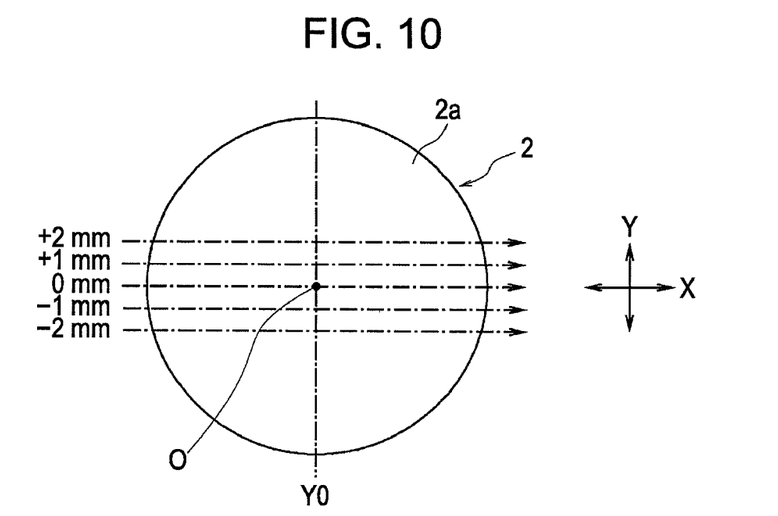
FIG. 10 is an explanatory view representing five patterns for linearly moving the X-direction detection element as the example and the X-direction detection element as the comparative example toward the X-direction, respectively.

FIGS. 8 to 10 show the difference in the effects between the position detection apparatus 1 according to the example and a position detection apparatus 1s as a comparative example.

FIG. 8 shows a positional relationship between the X-direction detection element 20x in the detection unit 10 of the position detection apparatus 1 according to the example, and the magnet 2, wherein FIG. 8A is a plan view and FIG. 8B is a side view. As described above, the X-direction detection element 20x has the fixing magnetizing direction (P-direction) of the fixed magnetic layer 24 directed to the (+)X-direction, and the bias magnetic field applied to the free magnetic layer 26 directed to the (+)Z-direction.

FIG. 9 illustrates the position detection apparatus 1s as the comparative example, which employs the magnetoresistive effect element 20 as an X-direction detection element 20s with the same structure as that of the X-direction detection element 20x according to the example. In the comparative example, the X-direction detection element 20s has the fixing magnetizing direction (P-direction) of the fixed magnetic layer 24 directed to the (+)X-direction likewise the case according to the example. The bias magnetic field (B-direction) applied to the free magnetic layer 26 is directed to the (+)Y-direction.

In the position detection apparatus 1s as shown in FIG. 9, when the X-direction detection element 20s moves toward the (+)X-direction while passing the center O of the magnet 2, the magnetizing direction of the free magnetic layer 26 is inclined to the (+)X-direction to lower the electric resistance of the X-direction detection unit 20s. When the X-direction detection element 20s moves toward the (−)X-direction while passing the center O of the magnet 2, the magnetic resistance of the X-direction detection element 20s is increased. The X-direction detection element 20s as the comparative example has the fixed resistance element 35 connected thereto in series as shown in FIG. 7 to form the circuit for applying the power-supply voltage Vcc. Then the potential at the intermediate point 36 is detected to locate the opposed position on the X-coordinate between the X-direction detection element 20s and the magnet 2.

In the position detection apparatus 1s shown in FIG. 9, when the X-direction detection element 20s moves toward the (+)Y-direction from the center O of the magnet 2, the bias magnetic field applied to the free magnetic layer 26 in the B-direction is intensified by the (+)Y-direction component of the magnetic field on the magnet 2. Meanwhile, when the X-direction detection element 20s moves toward the (−)Y-direction from the center O of the magnet 2, the bias magnetic field applied to the free magnetic layer 26 in the B-direction is weakened by the (−Y)-direction component of the magnetic field on the magnet 2.

The detection output of the X-direction detection element 20s at the movement position in the X-direction becomes different between the case where the X-direction detection element 20s is at the (+)Y side and the (−)Y side from the center O of the magnet 2.

Meanwhile, in the position detection apparatus 1 according to the example, the bias magnetic field (in the B-direction) applied to the free magnetic layer 26 of the X-direction detection element 20x is directed perpendicular to the surface 2a of the magnet 2 (in the (+)Z-direction) as shown in FIG. 8B. Accordingly, in the cases where the X-direction detection element 20x moves toward the (+)Y side and the (−)Y side from the center O of the magnet, the bias magnetic field applied to the free magnetic layer 26 is constantly intensified toward the (+)Z-direction in the magnetic field from the surface 2a of the magnet 2. That is, unlike the comparative example, the magnetic field from the magnet does not act on the bias magnetic field in the opposite direction depending on the location of the detection element at the (+)Y side or the (−)Y side from the center O of the magnet 2.

This makes it possible to prevent a large error in measurement of intensity of the X-direction component of the magnetic field depending on the cases where the X-direction detection element 20x is at the (+)Y side and the (−)Y side from the center O.

FIG. 10 shows each track of linear movement of the X-direction detection element 20x according to the example shown in FIGS. 8A and 8B, and the X-direction detection element 20s as the comparative example shown in FIG. 9 toward the X-direction when the center Oa is apart from the surface 2a of the magnet 2 by Zh=1.5 mm. The track of linear movement of the X-direction detection element toward the X-direction while passing the center O of the magnet 2 is represented as "0 mm" as shown in FIG. 10. The track of linear movement of the X-direction detection element toward the X-direction at a position apart from the center O to the (+)Y side by 1 mm is represented as "+1 mm" as shown in FIG. 10. The track of linear movement of the X-direction detection element toward the X-direction at a position apart from the center O to the (+)Y side by 2 mm is represented as "+2 mm". The track of linear movement of the X-direction detection elements toward the X-direction at a position apart from the center O to the (−)Y side by 1 mm is represented as "−1 mm". The track of linear movement of the X-direction detection elements toward the X-direction at a position apart from the center O to the (−)Y side by 2 mm is represented as "−2 mm" in FIG. 10.

Figure 11A:
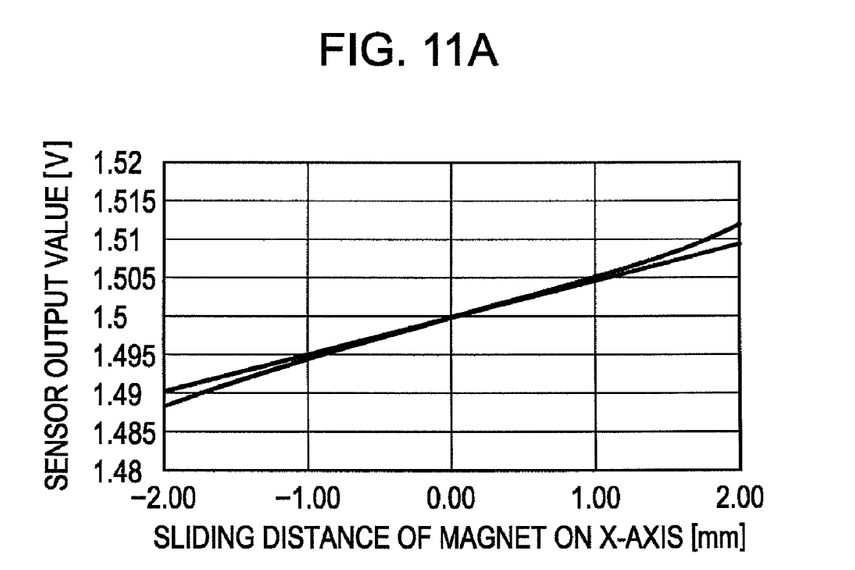
FIG. 11A is a graph with respect to detection output values obtained by moving the X-direction detection element of the present example along the tracks shown in FIG. 10.
Figure 11B:
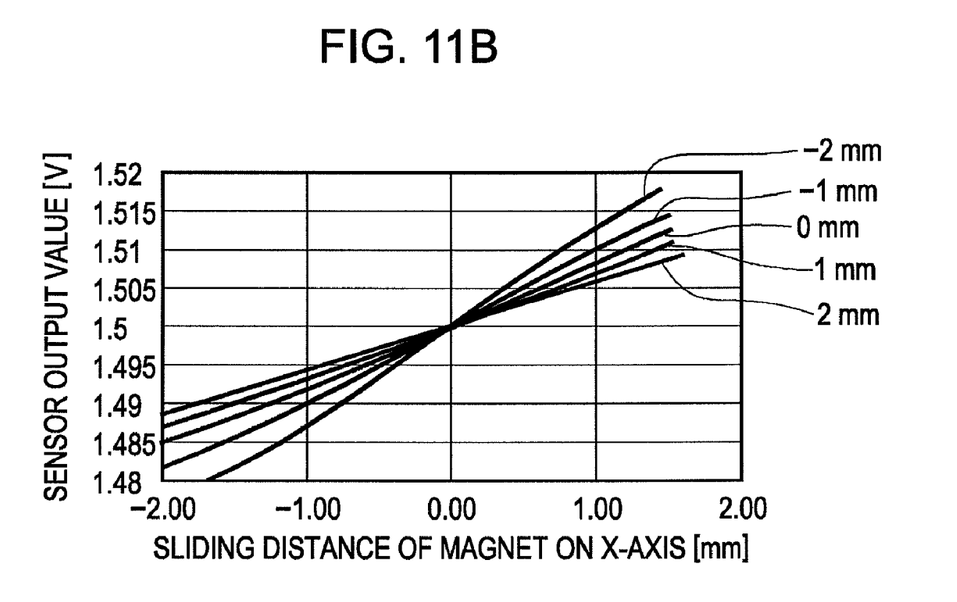
FIG. 11B is a graph with respect to detection output values obtained by moving the X-direction detection element of the comparative example along the tracks shown in FIG. 10.

FIG. 11A shows output values of the detection unit using the X-direction detection element 20x according to the example. FIG. 11B shows output values of the detection unit using the X-direction detection element 20s as the comparative example. In each of the aforementioned views, the X-axis denotes the displacement of the magnet 2 toward the X-direction from the Y0-axis while passing the center O of the magnet 2. The displacement toward the X-direction is in the range from −2 mm to +2 mm. The Y-axis denotes the detection output values corresponding to the change in the potential at the intermediate point 36 shown in FIG. 7.

Referring to FIG. 11B showing the detection unit using the X-direction detection element 20s as the comparative example, as the displacement track moves away from the center O of the magnet 2 toward the Y-direction, the change ratio (proportional constant) of the detection value with respect to the movement position toward the X-direction differs. The bias magnetic field applied to the free magnetic layer 26 is greatly influenced by the (+)Y-direction component and the (−)Y-direction component of the magnetic field of the surface 2a of the magnet 2 at the (+)Y side and the (−)Y side from the center O. Meanwhile, in the case of the detection unit using the X-direction detection element 20x according to the example, the movement position in the X-direction may be detected at substantially the same change ratio irrespective of the movement toward the X-direction at an arbitrary position on the track as shown in FIG. 11A.

Figure 12:
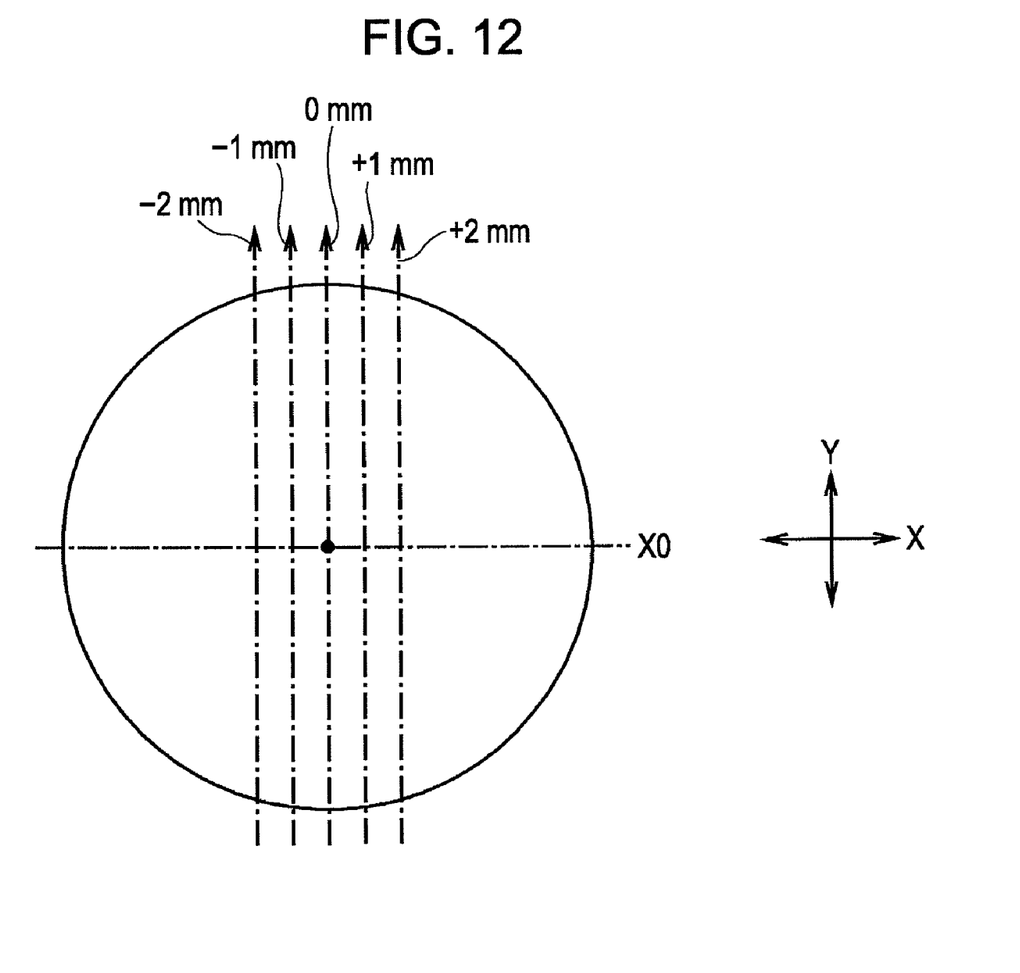
FIG. 12 is an explanatory view representing five patterns for linearly moving the X-direction detection element of the example and the X-direction detection element of the comparative example toward the Y-direction, respectively.

FIG. 12 shows each track of linear movement toward the Y-direction of the X-direction detection element 20x according to the example and the X-direction detection element 20s as the comparative example when the center Oa is apart from the surface 2a of the magnet 2 by Zh=1.5 mm. The track of the linear movement toward the Y-direction at the position passing the center O of the magnet 2 is represented as "0 mm" as shown in FIG. 12. The track of the linear movement toward the Y-direction at the position apart from the center O to the (+)X side by 1 mm is represented as "+1 mm". The track of the linear movement toward the Y-direction at the position apart from the center O to the (+)X side by 2 mm is represented as "+2 mm" The track of the linear movement toward the Y-direction at the position apart from the center O to the (−)X side by 1 mm is represented as "−1 mm". The track of the linear movement toward the Y-direction at the position apart from the center O to the (−)X side by 2 mm is represented as "−2 mm".

Figure 13A:
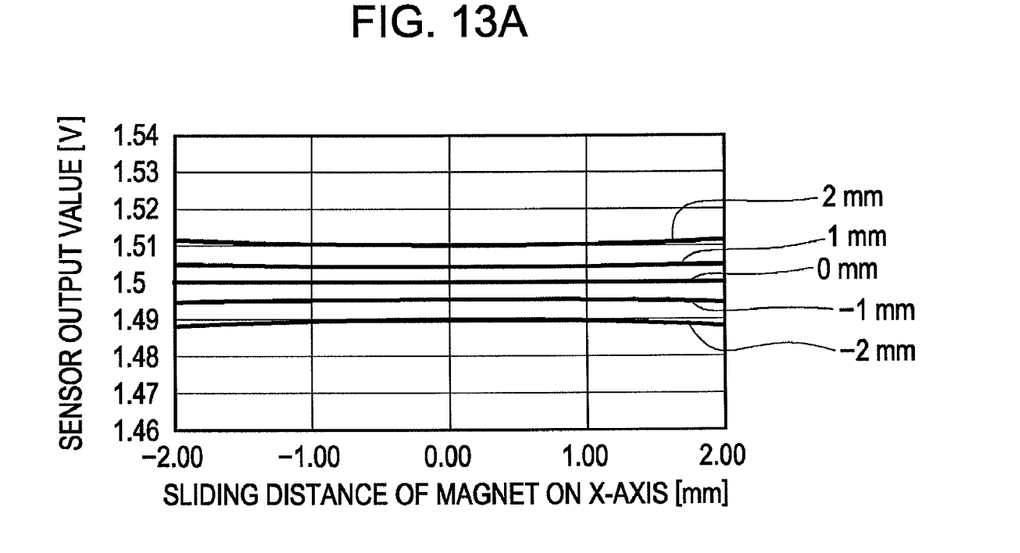
FIG. 13A is a graph with respect to detection output values obtained by moving the X-direction detection element as the present example along the tracks shown in FIG. 12.
Figure 13B:
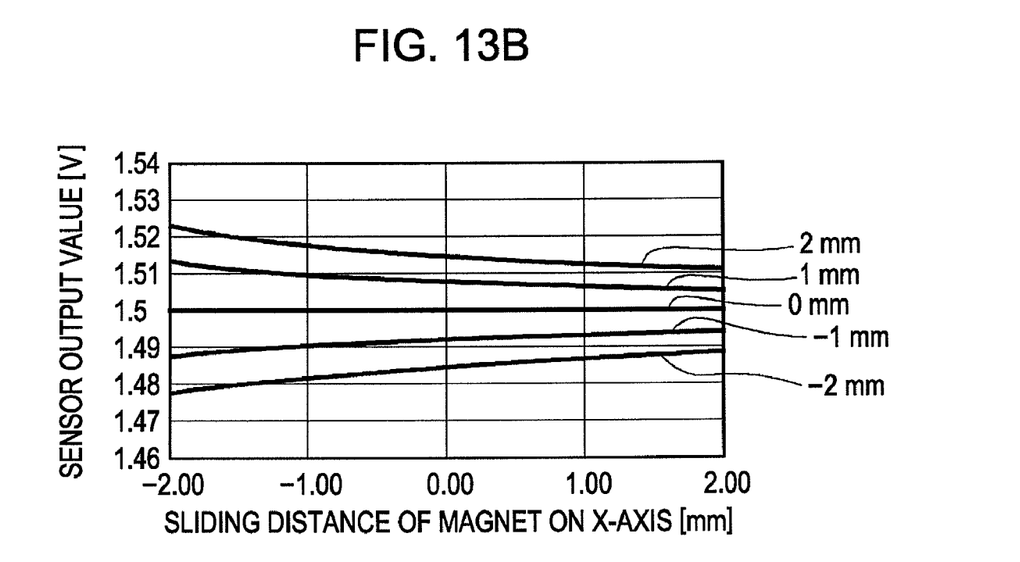
FIG. 13B is a graph with respect to detection output values obtained by moving the X-direction detection element as the comparative example along the tracks shown in FIG. 12.

FIG. 13A shows output values of the detection unit using the X-direction detection element 20x according to the example upon movement toward the Y-direction along the track shown in FIG. 12. FIG. 13B shows output values of the detection unit using the X-direction detection element 20s as the comparative example upon movement toward the Y-direction along the track shown in FIG. 12. In each of the aforementioned views, the X-axis denotes the displacement toward the Y-direction from the X0-axis passing the center O of the magnet 2. The displacement toward the Y-direction is in the range from −2 mm to +2 mm. The Y-axis denotes the detection output values corresponding to the change in the potential at the intermediate point 36 shown in FIG. 7.

In the case where the detection unit is moved toward the Y-direction along any of the tracks shown in FIG. 12, essentially, the X-direction detection output value is not expected to change. The detection unit using the X-direction detection element 20s as the comparative example has the detection values at the position in the X-direction changed depending on the movement track upon movement toward the Y-direction as shown in FIG. 13B. The detection values at the X position upon movement along the respective tracks are converged on zero to the direction of the (+)Y side. This means that the bias magnetic field applied to the free magnetic layer 26 is greatly influenced by the Y-direction component of the magnetic field from the surface 2a of the magnet 2.

As FIG. 13A shows, the detection unit using the X-direction detection element 20x according to the example provides substantially uniform detection values of the movement position in the X-direction in spite of the movement toward the Y-direction at the arbitrary position on the respective tracks shown in FIG. 12.

Figure 14:
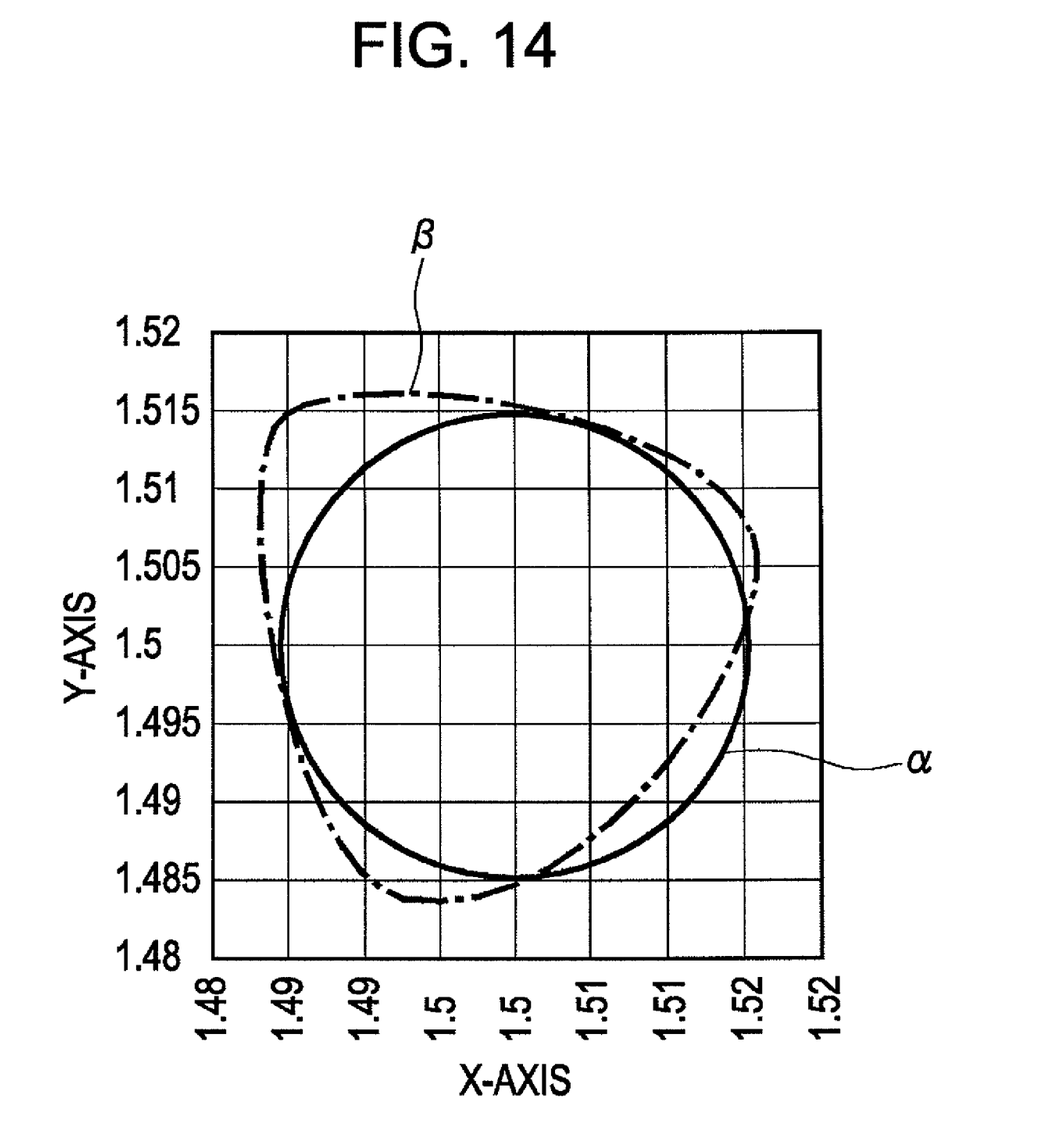
FIG. 14 is a graph representing the detection position on the X-Y coordinate obtained when moving the detection unit as the example and the detection unit as the comparative example along the true circle track on the magnet surface.

A code □ of FIG. 14 denotes a detection output value at a movement position on the X-Y coordinate from the detection unit 10 using the X-direction detection element 20x and the Y-direction detection element 20y according to the example of the present invention when it is moved to draw the track of the true circle with the radius of 1.5 mm from the center O in the state where each center Oa of the respective detection elements is apart from the surface 2a of the magnet 2 by Zh=1.5 mm. The detection output □ shown in FIG. 14 is substantially approximated to the change in the position of the true circle.

Meanwhile, the detection unit as the comparative example has the X-direction detection element 20s installed therein as shown in FIG. 9, and the Y-direction detection element installed, which directs the fixing magnetizing direction (P-direction) of the X-direction detection element 20s to the Y-direction and directs the bias magnetic field (in the B-direction) to the (−)X-direction. A code □ shown in FIG. 14 denotes the detection position on the X-Y coordinate when the detection unit as the comparative example is moved along the true circle track with the radius of 1.5 mm likewise the case of the detection unit according to the example. In the comparative example, the bias magnetic field is greatly susceptible to the influence of the magnetic field of the magnet 2, thus failing to provide the output of the true circle track.

In the present invention, the bias magnetic field applied to the free magnetic layer 26 of the X-direction detection element 20x and the bias magnetic field applied to the free magnetic layer 26 of the Y-direction detection element 20y may be oppositely directed, that is, one is directed to the (+)Z-direction, and the other is directed to the (−)Z-direction.

The detection unit may be provided with the X-direction detection element 20x only for detecting the movement position toward the X-direction. Alternatively, the detection unit may be provided with the detection element only for detecting the movement position toward the Y-direction. In any of the aforementioned cases, the magnet may have the rectangular shape which is thin and long in the X- or Y-direction. The aforementioned structure may function as the linear sensor for detecting the movement position toward the X- or Y-direction.

The invention claimed is:

1. A position detection apparatus which includes a fixed portion and a movable portion which moves along a plane opposite the fixed portion, a magnet is provided for one of the fixed portion and the movable portion, and a detection unit for detecting a magnetic field generated from the magnet is provided for the other of the fixed portion and the movable portion, wherein:

the magnet has a surface to which the detection unit is oppositely disposed, and the surface and a back side portion are magnetized to opposite magnetic poles;

the detection unit includes a magnetoresistive effect element which is provided with a fixed magnetic layer having a magnetizing direction fixed, and a free magnetic layer magnetized by the magnetic field applied from the magnet, and has an electric resistance value changed in accordance with a relative angle defined by a fixing magnetizing direction of the fixed magnetic layer and a magnetizing direction of the free magnetic layer so that the fixing magnetizing direction of the fixed magnetic layer is directed along the plane, and a bias magnetic field orthogonal to the plane is applied to the free magnetic layer; and a change in a resistance of the magnetoresistive effect element allows detection of a position of the movable portion in the plane.

2. The position detection apparatus according to claim 1, wherein each displacement of the detection unit toward one side and the other side with respect to a center of the magnet at which a magnetic field component in a direction of the plane becomes theoretically zero is allowed to be detected.

3. The position detection apparatus according to claim 1, wherein the detection unit includes two units of the magnetoresistive effect elements, which have fixing magnetizing directions of the fixed magnetic layers orthogonal with each other, and directions of the bias magnetic fields perpendicular to the plane.

4. The position detection apparatus according to claim 1, wherein the surface of the magnet has a circular shape.

* * * * *